(12) United States Patent
Brabant

(10) Patent No.: US 11,408,988 B2
(45) Date of Patent: Aug. 9, 2022

(54) SYSTEM AND METHOD FOR ACOUSTIC VEHICLE LOCATION TRACKING

(71) Applicant: Howden Alphair Ventilating Systems Inc., Winnipeg (CA)

(72) Inventor: Claude Brabant, Saint-Hubert (CA)

(73) Assignee: HOWDEN ALPHAIR VENTILATING SYSTEMS INC., Manitoba (CA)

( * ) Notice: Subject to any disclaimer, the term of this patent is extended or adjusted under 35 U.S.C. 154(b) by 990 days.

(21) Appl. No.: 16/139,398

(22) Filed: Sep. 24, 2018

(65) Prior Publication Data

US 2020/0096624 A1 Mar. 26, 2020

(51) Int. Cl.
| | |
|---|---|
| *G01S 11/14* | (2006.01) |
| *G01S 13/86* | (2006.01) |
| *G01S 13/93* | (2020.01) |
| *G01S 13/931* | (2020.01) |
| *G06F 16/632* | (2019.01) |

(52) U.S. Cl.
CPC ............ *G01S 11/14* (2013.01); *G01S 13/862* (2013.01); *G01S 13/931* (2013.01); *G06F 16/634* (2019.01); *G01S 2013/9324* (2020.01)

(58) Field of Classification Search
CPC ...... G01S 11/14; G01S 13/862; G01S 13/931; G01S 2013/9324; G01S 5/06; G01S 5/0244; G01S 5/0264; G01S 5/02; G01S 5/18; G01S 13/91; G06F 16/634
USPC ....................................................... 367/124
See application file for complete search history.

(56) References Cited

U.S. PATENT DOCUMENTS

| 5,619,616 | A | 4/1997 | Brady et al. |
|---|---|---|---|
| 5,798,983 | A | 8/1998 | Kuhn et al. |
| 6,504,490 | B2 | 1/2003 | Mizushima |
| 8,111,174 | B2 | 2/2012 | Berger et al. |
| 8,164,484 | B2 | 4/2012 | Berger et al. |
| 8,862,146 | B2 | 10/2014 | Shatsky et al. |
| 8,983,677 | B2 | 3/2015 | Wright et al. |
| 8,985,523 | B2 | 3/2015 | Chadwick et al. |

(Continued)

FOREIGN PATENT DOCUMENTS

| DE | 102007051261 A1 | 4/2009 |
|---|---|---|
| GB | 2355527 A | 4/2001 |

*Primary Examiner* — Daniel L Murphy
(74) *Attorney, Agent, or Firm* — Edell, Shapiro & Finnan, LLC

(57) ABSTRACT

Techniques for acoustic vehicle location tracking are presented. In one embodiment, a processor receives, from a radio-frequency positioning system, measurements of a candidate location for a plurality of vehicles and receives, from a plurality of acoustic sensors, acoustic signals associated with a detected vehicle. The acoustic signals are compared to an acoustic vehicle signature library that includes acoustic information associated with the vehicles. Upon determining that the acoustic signals match acoustic information associated with a vehicle in the acoustic vehicle signature library, the measurements of the candidate location of the detected vehicle based on the radio-frequency signals are compared with a location of the vehicle based on the acoustic signals. Upon determining that the measurements of the candidate location are within a predetermined area of the location of the detected vehicle, the measurements are provided to a vehicle location database.

20 Claims, 6 Drawing Sheets

(56) References Cited

U.S. PATENT DOCUMENTS

| | | |
|---|---|---|
| 9,253,560 B2 | 2/2016 | Goldstein et al. |
| 9,651,649 B1 * | 5/2017 | Salloum et al. |
| 9,689,958 B1 * | 6/2017 | Wild ........................ G01S 3/801 |
| 9,911,336 B2 | 3/2018 | Schlechter et al. |
| 2015/0271601 A1 | 9/2015 | Boss et al. |
| 2017/0154481 A1 | 6/2017 | Chen et al. |

\* cited by examiner

SYSTEM AND METHOD FOR ACOUSTIC VEHICLE LOCATION TRACKING

TECHNICAL FIELD

The present disclosure relates to vehicle location tracking systems.

BACKGROUND

A variety of different systems for determining a vehicle's location are available. Commonly, a vehicle may use a location derived from a global positioning system (GPS), which relies on the availability of satellites to determine the vehicle's location. However, in some environments, satellites may not be available. For example, in underground or indoor environments, such as underground mining facilities or warehouses, access is not available to satellites in order to use GPS to determine a vehicle's location. As a result, in these types of environments, other vehicle positioning systems are used instead to determine a vehicle's location. A majority of these other vehicle positioning systems are radio-frequency (RF) based positioning systems that use triangulation or other techniques that include receiving multiple RF signals to determine a vehicle's location.

Due to conditions in these underground or indoor environments that cause reflection of RF signals, however, accuracy problems can arise with conventional RF positioning systems. For example, multi-path interference can be caused by RF signals that are reflected by the walls and/or other obstacles in these environments and these reflected RF signals can be detected by a receiver of the RF positioning system. These reflected RF signals can cause accuracy problems because the receiver cannot discriminate between the RF signals received directly from the vehicle and the reflected RF signals, leading to anomalous determination of a vehicle's location.

DESCRIPTION OF EXAMPLE EMBODIMENTS

Overview

Figure 1:
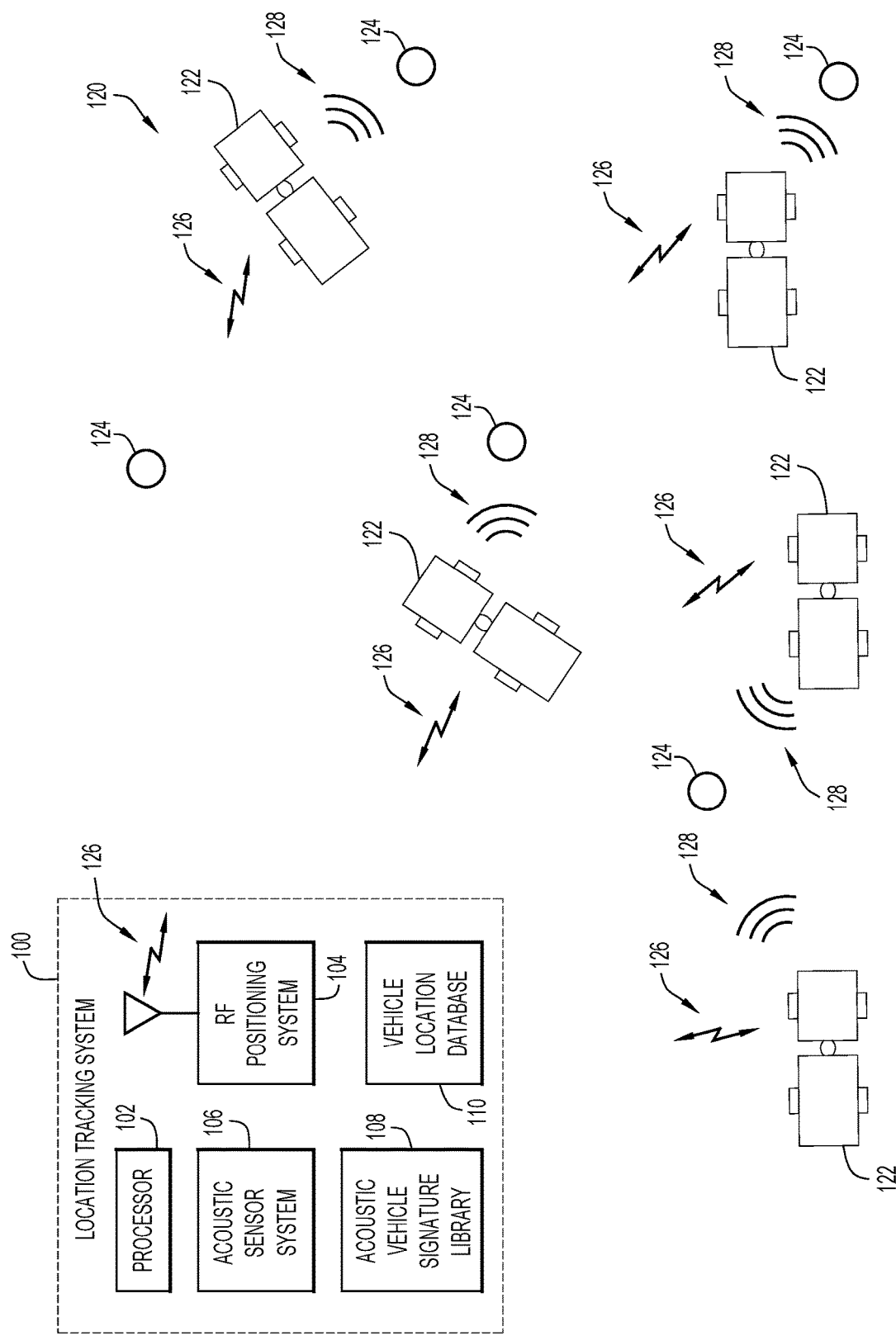
FIG. 1 is a diagram of a location tracking system for implementing acoustic vehicle location tracking, according to an example embodiment.

Techniques for acoustic vehicle location tracking are presented. In an example embodiment, a system is provided, the system including a radio-frequency positioning system. The system also includes a plurality of acoustic sensors, a vehicle location database, and at least one processor in communication with the radio-frequency positioning system, the plurality of acoustic sensors, and the vehicle location database. The processor is configured to receive, from the radio-frequency positioning system, signals associated with measurements of a candidate location for each vehicle of a plurality of vehicles. The processor is also configured to receive, from the plurality of acoustic sensors, one or more acoustic signals associated with a detected vehicle of the plurality of vehicles. The one or more acoustic signals are compared to an acoustic vehicle signature library to determine whether the one or more acoustic signals match acoustic information associated with at least one vehicle of the plurality of vehicles. The acoustic vehicle signature library includes a plurality of acoustic information associated with the plurality of vehicles. Upon determining that the one or more acoustic signals match acoustic information associated with at least one vehicle in the acoustic vehicle signature library, the processor is configured to compare the measurements of the candidate location of the detected vehicle based on the signals from the radio-frequency positioning system with a location of the detected vehicle based on the one or more acoustic signals from the plurality of acoustic sensors. Upon determining that one or more of the measurements of the candidate location is within a predetermined area of the location of the detected vehicle, the processor is configured to provide the one or more measurements to the vehicle location database.

Example Embodiments

In underground or indoor environments, such as underground mining facilities or warehouses, the location of vehicles in the environment may be monitored remotely by a location tracking system. Vehicles may include, for example, excavators, dump trucks, drill rigs, loaders, conveyors, and other types of heavy equipment that are used in underground mining facilities to perform a variety of tasks. Unlike above-ground mining facilities, underground mining facilities do not have access to GPS signals, so a variety of other types of vehicle positioning systems may be used in these environments for vehicle location tracking. For example, a radio-frequency (RF) based positioning system may be used to provide information about vehicles at a facility to a location tracking system.

Typically, RF-based positioning systems use trilateration or triangulation techniques based on measurements from multiple sensors or emitters to determine a location of a vehicle. For example, RF-based positioning systems may use received signal strength (RSS), time of arrival (TOA), time difference of arrival (TDOA), and/or angle of arrival (AOA) to determine a vehicle's position. Additionally, in such systems vehicles may include active transmitters which may regularly send position signals from a vehicle to sensors of the RF based positioning system or passive transponders that send position signals in response to receiving an interrogating signal from sensors of the RF based positioning system. As noted above, however, conditions in underground or indoor environments can reflect RF signals and cause problems with accurate position calculations based on these signals.

According to the principles of the example embodiments described herein, techniques for acoustic vehicle location tracking are presented to improve the accuracy of existing RF-based positioning systems in environments where reflected RF signals are a problem, such as in underground or indoor environments, including underground mining facilities or warehouses. The techniques of the example embodiments can help prevent the use of spurious or inaccurate measurements of a vehicle's location based on signals from sensors of the RF based positioning system by comparing the measurements with a location of the vehicle determined based on acoustic sensor signals.

With reference to FIG. 1, a location tracking system 100 is shown according to an example embodiment. Location tracking system 100 includes at least one processor 102 in communication with other components of location tracking system 100, including an RF positioning system 104, an acoustic sensor system 106, an acoustic vehicle signature library 108, and a vehicle location database 110. In some embodiments, location tracking system 100 may be used in an environment 120 to track the position of a plurality of vehicles 122. For example, environment 120 may be an underground or indoor environment where GPS is unavailable or unreliable. In one embodiment, environment 120 is an underground mining facility and plurality of vehicles 122 include various types of vehicles used for mining, such as excavators, dump trucks, drill rigs, loaders, conveyors, and other types of heavy equipment.

Location tracking system 100 includes RF positioning system 104 that uses measurements from RF-based signals to determine location and/or position information associated with plurality of vehicles 122. For example, as shown in FIG. 1, plurality of vehicles 122 may send RF signals 126 associated with measurements of each vehicle's location to RF positioning system 104. Additionally, acoustic sensor system 106 may be associated with a plurality of acoustic sensors 124 that are disposed at various areas in environment 120. Acoustic sensor system 106 may receive acoustic signals 128 associated with one or more of plurality of vehicles 122 that are detected by plurality of acoustic sensors 124.

Acoustic sensors 124 may be any type of suitable sensor configured to detect sound. For example, acoustic sensors 124 may be microphones, microelectromechanical sensors (MEMS), or other known sensors that are configured to detect acoustic or aural information, such as sound. In an example embodiment, acoustic signals 128 from plurality of acoustic sensors 124 may include acoustic information associated with a detected vehicle, for example, frequencies, noise levels, sound wave shapes, intensity, duration, as well as other relevant information that may be detected by an acoustic sensor.

Acoustic vehicle signature library 108 may include a database or other non-transitory data structure that contains stored acoustic information for one or more of plurality of vehicles 122. For example, in some embodiments, each vehicle of the plurality of vehicles 122 may be associated with an entry in acoustic vehicle signature library 108. In other embodiments, acoustic information stored in acoustic vehicle signature library 108 may be associated with a plurality of vehicle groups. Vehicle groups may be based on any combination of common characteristics across the plurality of vehicles 122. For example, common characteristics that may be used to form a vehicle group may include, but is not limited to, vehicle type, vehicle size, vehicle purpose or capabilities, vehicle weight, hauling capacity, engine type or size, manufacturer and/or model, fuel type, assigned duty area, work schedule or shift, as well as other characteristics associated with the vehicle and/or a vehicle user.

In one embodiment, the stored acoustic information for one or more of vehicles 122 in acoustic vehicle signature library 108 may include predetermined entries for each vehicle of the plurality of vehicles 122 in environment 120. For example, a vehicle of the plurality of vehicles 122 may be associated with an entry in acoustic vehicle signature library 108 based on the vehicle manufacturer and/or model. In other embodiments, acoustic vehicle signature library 108 may be generated by recording acoustic information for each vehicle of the plurality of vehicles 122 and storing the recorded acoustic information in an entry in acoustic vehicle signature library 108. In still other embodiments, acoustic vehicle signature library 108 may be regularly updated, for example, by adding entries with acoustic information for new vehicles as they are added to environment 120 and/or by updating existing entries for vehicles with new acoustic information to take into account any changes in the acoustic information that may occur over time.

Vehicle location database 110 may include memory or other non-transitory computer readable storage media configured to store information associated with the plurality of vehicles 122 in environment 120. Vehicle location database 110 may include information associated with one or more of a position, orientation, speed, and/or heading of each vehicle of the plurality of vehicles 122. In some embodiments, vehicle location database 110 may also include other information associated with the plurality of vehicles 122, such as, a vehicle identifier, working area, vehicle type, user information, and/or other information associated with each vehicle of the plurality of vehicles 122.

Vehicle location database 110 is in communication with processor 102 and may also be in communication with a display or other interface to allow a user or monitoring system to determine the current location of each vehicle of the plurality of vehicles 122 in environment 120. For example, in embodiments where environment 120 is an underground mining facility, vehicle location database 110 may allow a user or monitoring system to track the location of each vehicle of the plurality of vehicles 122 in different parts or areas of the mining facility. With this arrangement, the information derived from vehicle location database 110 may be used to instruct vehicles for routing, traffic avoidance, and/or workload purposes.

According to the principles of the example embodiments described herein, locations of one or more of plurality of vehicles 122 may be detected by a plurality of acoustic sensors 124 of acoustic sensor system 106 and compared with measurements of candidate locations of vehicles 122 based on signals from RF positioning system 104. With this arrangement, inaccurate or spurious measurements of a candidate location for a vehicle from RF positioning system 104 may be discarded or rejected if the candidate location is not within a predetermined area of the location determined by acoustic sensor system 106. In this manner, acoustic sensor system 106 may act as a pre-filter or screening stage for measurements from RF positioning system 104 to eliminate false measurements caused by reflected RF signals.

Figure 2:
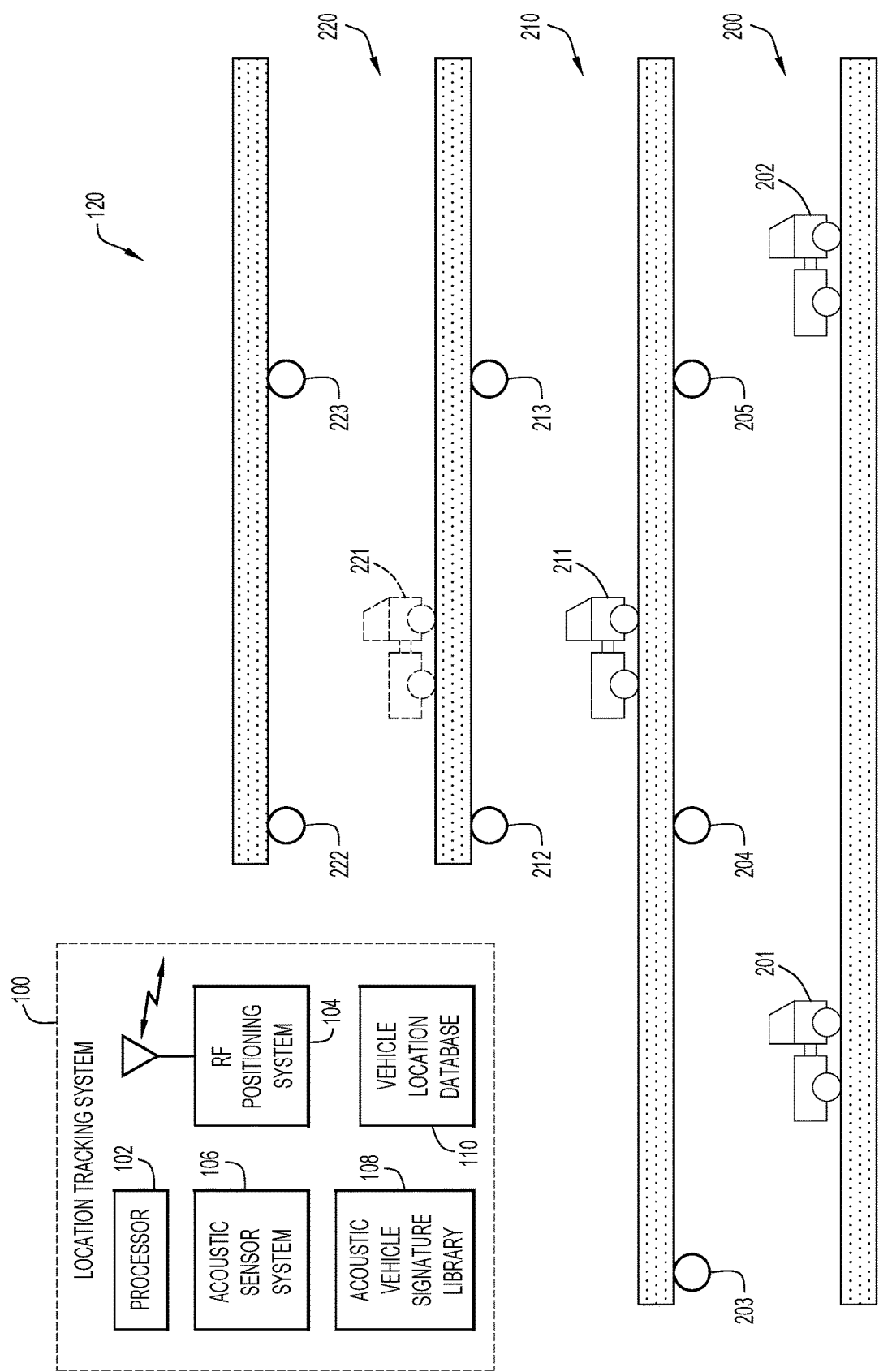
FIG. 2 is a representative diagram of an environment in which acoustic vehicle location tracking may be implemented, according to an example embodiment.

Referring now to FIG. 2, environment 120 in which acoustic vehicle location tracking may be implemented is shown according to an example embodiment. In one embodiment, environment 120 may be an underground mining facility that includes multiple levels or working areas. For example, as shown in FIG. 2, environment 120 may include a first level 200, a second level 210, and a third level 220. Location tracking system 100 is configured to track the position of plurality of vehicles 122 throughout environment 120, including levels 200, 210, 220.

In this embodiment, environment 120 includes the plurality of vehicles 122 that are performing various tasks on different levels of environment 120, including a first vehicle 201 and a second vehicle 202 that are working on first level 200, and a third vehicle 211 that is working on second level 210. As described above, in some situations, reflected RF signals from RF positioning system 104 may cause inaccurate or spurious measurements of a vehicle location where no vehicle is actually located. For example, as shown in FIG. 2, a false measurement 221 of a vehicle location is shown on third level 220 of environment 120 due to measurements associated with reflected RF signals received by RF positioning system 104. In this embodiment, reflected RF signals associated with measurements of a location of third vehicle 211 by RF positioning system 104 may be reflected or otherwise inaccurate to cause a measurement of a candidate location for third vehicle 211 on second level 210 to instead be shown as false measurement 221 on third level 220 of environment 120. In some cases, false measurement 221 may cause a location of a vehicle to appear to teleport or jump between second level 210 and third level 220 of environment 120, which may lead to inaccuracies in a vehicle location database.

The example embodiments described herein, however, provide a pre-filtering or screening stage using location information for vehicles from acoustic sensor system 106 to allow location tracking system 100 to eliminate or discard measurements associated with reflected RF signals that indicate a candidate location associated with false measurement 221. As shown in FIG. 2, acoustic sensors 124 are disposed at various locations, levels, and/or areas throughout environment 120, including a first acoustic sensor 203, a second acoustic sensor 204, and a third acoustic sensor 205 disposed on first level 200; a fourth acoustic sensor 212 and a fifth acoustic sensor 213 disposed on second level 210; and a sixth acoustic sensor 222 and a seventh acoustic sensor 223 disposed on third level 220. It should be understood that the number and locations of acoustic sensors 203, 204, 205, 212, 213, 222, 223 shown in FIG. 2 are merely an example and an environment may have any number of acoustic sensors disposed at any desired locations.

Figure 3:
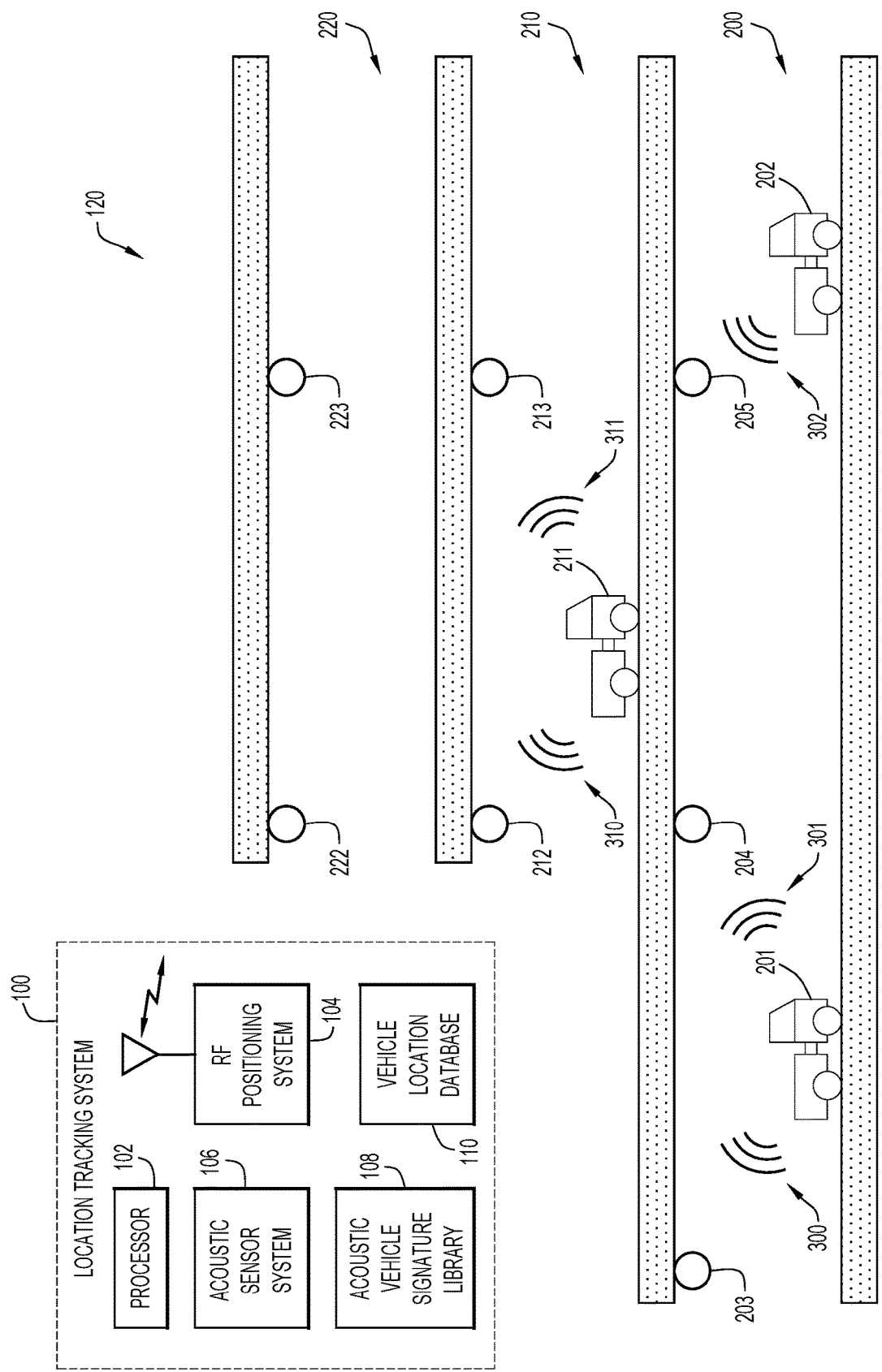
FIG. 3 is a representative diagram of acoustic vehicle location tracking implemented in an exemplary environment, according to an example embodiment.

Referring now to FIG. 3, techniques for acoustic vehicle location tracking according to the principles of the exemplary embodiments is shown in reference to environment 120. In this embodiment, environment 120 is an underground mining facility that includes multiple levels, including first level 200, second level 210, and third level 220 and includes plurality of acoustic sensors 124, including acoustic sensors 203, 204, 205, 212, 213, 222, 223, described above. As will be described in detail below, location tracking system 100 is configured to use acoustic signals associated with one or more detected vehicles to confirm or discard measurements of candidate locations of vehicles that are obtained by signals associated with RF positioning system 104.

In this embodiment, one or more vehicles of the plurality of vehicles 122 may be detected by acoustic sensors 124 at various locations throughout environment 120. For example, as shown in FIG. 3, first vehicle 201 travelling on first level 200 of environment 120 may be detected by one or more acoustic sensors, including first acoustic sensor 203 and second acoustic sensor 204. As first vehicle 201 passes by or near first acoustic sensor 203 and second acoustic sensor 204, acoustic signals are detected by first acoustic sensor 203 and second acoustic sensor 204. For example, as shown in FIG. 3, first acoustic sensor 203 detects a first acoustic signal 300 associated with detected first vehicle 201 and second acoustic sensor 204 detects a second acoustic signal 301 also associated with detected first vehicle 201.

Similarly, a third acoustic signal 302 associated with second vehicle 202 may be detected by third acoustic sensor 205 as second vehicle 202 passes by or near third acoustic sensor on first level 200 of environment. Additionally, as described above, acoustic sensors may be located on multiple levels or areas of environment 120. For example, on second level 210 of environment 120, fourth acoustic sensor 212 may detect a fourth acoustic signal 310 associated with detected third vehicle 211 and fifth acoustic sensor 213 may detect a fifth acoustic signal 311 that is also associated with detected third vehicle 211.

In contrast to FIG. 2, however, in this embodiment, sixth acoustic sensor 222 and seventh acoustic sensor 223 located on third level 220 of environment 120 do not receive any acoustic signals associated with a detected vehicle on third level 220. Accordingly, inaccurate or spurious measurements of a candidate location of a vehicle being located on third level 220 obtained from RF positioning system 104, for example, false measurement 221 shown in FIG. 2, may be rejected or discarded based on the acoustic signals detected from plurality of acoustic sensors 124 of acoustic sensor system 106.

Figure 4:
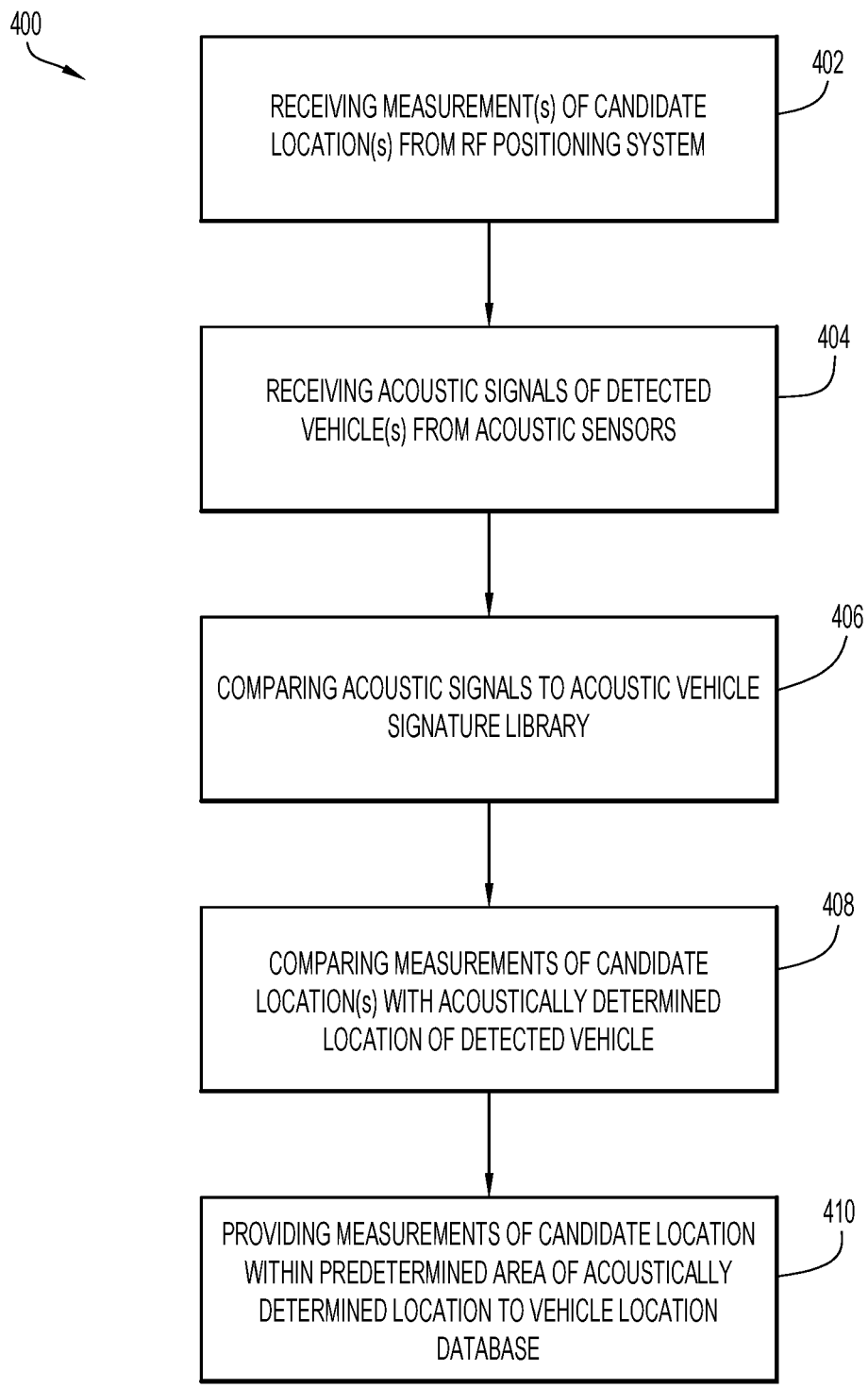
FIG. 4 is a flowchart of a method of implementing acoustic vehicle location tracking, according to an example embodiment.

FIG. 4 illustrates a flowchart of a method 400 of implementing acoustic vehicle location tracking according to an example embodiment. In some embodiments, method 400 may be implemented by location tracking system 100, including RF positioning system 104 and/or acoustic sensor system 106. In one embodiment, method 400 may begin at an operation 402 where one or more measurements of a candidate location of a vehicle are received from an RF positioning system. For example, operation 402 may include receiving RF signals 126 associated with measurements of a candidate location for at least one vehicle of plurality of vehicles 122 from RF positioning system 104.

Next, at an operation 404, one or more acoustic signals associated with a detected vehicle are received from acoustic sensors. For example, operation 404 may include receiving acoustic signals 128 associated with at least one detected vehicle of plurality of vehicles 122 from plurality of acoustic sensors 124 of acoustic sensor system 106. Method 400 further includes an operation 406 where the acoustic signals received at operation 404 are compared to an acoustic vehicle signature library, such as acoustic vehicle signature library 108. As described above, acoustic vehicle signature library 108 may include a plurality of acoustic information associated with plurality of vehicles 122 so that location tracking system 100 and/or acoustic sensor system 106 may compare the received acoustic signals from operation 404 to one or more entries of acoustic information in acoustic vehicle signature library 108 to determine whether the received acoustic signals match acoustic information associated with at least one vehicle of plurality of vehicles 122.

Upon determining that the received acoustic signals match acoustic information associated with at least one vehicle of plurality of vehicles 122 stored in acoustic vehicle signature library 108, method 400 may proceed to an operation 408. At operation 408, the measurements of the candidate location of the vehicle based on the received RF signals from RF positioning system 104 obtained at operation 402 are compared with a location of the detected vehicle based on the received acoustic signals from acoustic sensor system 106. For example, in some embodiments, plurality of acoustic sensors 124 are disposed at known locations throughout environment 120. Accordingly, a location of a detected vehicle may approximately correspond to a location of an acoustic sensor that detected the vehicle. Additionally, further techniques, such as analyzing received signal strength, noise levels, or multiple received acoustic signals, may be used to determine a location of a detected vehicle by acoustic sensor system 106 with improved accuracy.

The comparison performed at operation 408 includes determining whether the measurements of the candidate location of the vehicle based on the received RF signals from RF positioning system 104 are within a predetermined area of the location of the detected vehicle based on the received acoustic signals from acoustic sensor system 106. In some embodiments, the predetermined area may be a specific distance or range. In other embodiments, for example, where environment 120 is an underground mining facility having multiple levels or areas, the predetermined area may be associated with a particular level or area of the underground mining facility. In still other embodiments, the predetermined area may be a working area associated with the detected vehicle. For example, each vehicle of plurality of vehicles 122 may be associated with an assigned duty area, such as a specific level or portion of environment 120 where the vehicle is intended to be working. In these cases, measurements of a candidate vehicle location may be determined to be within the predetermined area when the assigned duty area for the vehicle corresponds to the working area. In other words, the candidate location of the vehicle is in a working area that matches its assigned duty area.

Upon determining at operation 408 that the measurements of the candidate location of the vehicle based on the RF signals are within the predetermined area of the acoustically determined location of the detected vehicle, then method 400 proceeds to an operation 410. At operation 410, the measurements of the candidate location of the vehicle from RF positioning system 104 are provided to vehicle location database 110. In other words, because the acoustically determined location of the detected vehicle from acoustic sensor system 106 confirms the candidate location of the vehicle based on the measurements from the RF signals from RF positioning system 104 (i.e., falls within the predetermined area), then the measurements are determined to be valid (i.e., not false or spurious) and may be provided to vehicle location database 110.

Upon determining at operation 408, however, that the measurements of the candidate location of the vehicle based on the RF signals are not within the predetermined area of the acoustically determined location of the detected vehicle, then the measurements may be rejected or discarded so that they are not provided to vehicle location database 110. With this arrangement, acoustic sensor system 106 may act as a pre-filter or screening stage for measurements from RF positioning system 104 to eliminate false measurements caused by reflected RF signals and the accuracy of vehicle location database 110 may be improved.

In some cases, multiple RF signals associated with separate measurements may be used to determine a candidate location for a vehicle. For example, in some RF based positioning systems, three or more RF signals associated with measurements of the same vehicle may be used to determine a candidate location for that vehicle (e.g., triangulation). In these cases, operation 408 of method 400 may include comparing each separate measurement obtained from the RF signals to the acoustically determined location of the detected vehicle and only providing the measurements that are within the predetermined area to vehicle location database 110 for use in determining the candidate location of the vehicle. In other words, each measurement of multiple measurements from RF positioning system 104 are compared with the acoustically determined location.

In other cases, RF signals associated with measurements of a candidate location of a vehicle may first be used to determine the candidate location. For example, three or more RF signals associated with measurements of the same vehicle may be used to determine a candidate location for that vehicle (e.g., triangulation) before comparing the candidate location to the acoustically determined location of the detected vehicle. In these cases, operation 408 of method 400 includes comparing the candidate location based on the RF signals to the acoustically determined location of the detected vehicle and only providing the measurements and/or candidate location to vehicle location database 110 when the candidate location is within the predetermined area.

Figure 5:
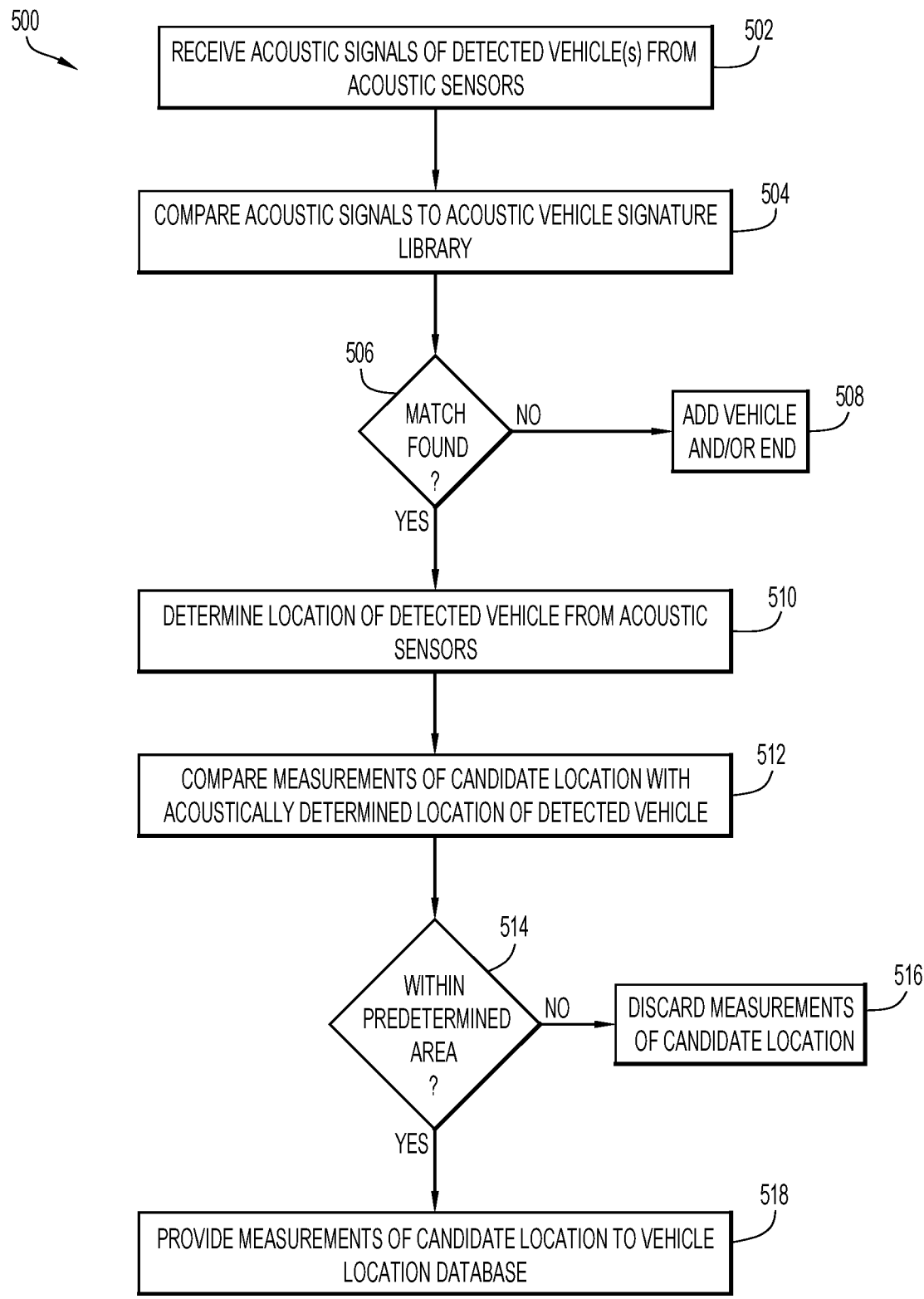
FIG. 5 is a flowchart of a method of implementing acoustic vehicle location tracking using an acoustic vehicle signature library, according to an example embodiment.

FIG. 5 is a flowchart of a method 500 of implementing acoustic vehicle location tracking using acoustic vehicle signature library 108, according to an example embodiment. One or more operations of method 400 may be described in more detail in reference to method 500. In this embodiment, method 500 includes details of comparing acoustic signals of a detected vehicle from one or more acoustic sensors of plurality of acoustic sensors 124 to acoustic vehicle signature library 108. In some embodiments, method 500 may be implemented by processor 102 and/or acoustic sensor system 106.

In some embodiments, method 500 may begin at an operation 502 where one or more acoustic signals of a detected vehicle or vehicles are received from at least one acoustic sensor. For example, as shown in FIG. 3, fourth acoustic signal 310 and fifth acoustic signal 311 associated with third vehicle 211 may be detected by fourth acoustic sensor 212 and fifth acoustic sensor 213. Operation 502 may further include providing the acoustic signals to acoustic sensor system 106 of location tracking system 100 for further processing in accordance with method 500.

Next, at an operation 504, the received acoustic signals from operation 502 are compared to associated acoustic information stored in an acoustic vehicle signature library. For example, processor 102 and/or acoustic sensor system 106 may compare received first acoustic signal 300 and second acoustic signal 301 to stored acoustic information associated with plurality of vehicles 122 contained in acoustic vehicle signature library 108.

At an operation 506, method 500 includes determining whether or not the received acoustic signals match any acoustic information in the acoustic vehicle signature library. In the example provided in reference to FIG. 3, operation 506 includes determining whether fourth acoustic signal 310 and fifth acoustic signal 311 match any acoustic information associated with a vehicle of plurality of vehicles 122 in acoustic vehicle signature library 108.

Upon determining at operation 506 that the received acoustic signals are not a match to any of the acoustic information stored in the acoustic vehicle signature library, then method 500 may proceed to an operation 508. At operation 508, because no match has been found method 500 may end. Optionally or alternatively, operation 508 may provide an option to add acoustic information associated with the detected vehicle based on the received acoustic signals from operation 502 to the acoustic vehicle signature library. Accordingly, operation 508 may allow an operator or user of location tracking system 100 to update or add new vehicles to acoustic vehicle signature library 108.

Upon determining at operation 506 that the received acoustic signals match acoustic information stored in the acoustic vehicle signature library for at least one vehicle, then method 500 may proceed to an operation 510. At operation 510, the location of the detected vehicle is determined from the one or more acoustic sensors that received the acoustic signals. For example, as shown in FIG. 3, the location of third vehicle 211 may be determined based on the locations of fourth acoustic sensor 212 and fifth acoustic sensor 213 in environment 120. In this example, fourth acoustic sensor 212 and fifth acoustic sensor 213 are located on second level 210 of environment 120 and may be further associated with more precise location information, such as having known reference locations relative to environment 120. With this arrangement, a location of a detected vehicle from the acoustic sensors may be determined at operation 510.

Next, at an operation 512, measurements of a candidate location of a vehicle based on the RF signals from RF positioning system 104 are compared with the acoustically determined location of the detected vehicle from operation 510. At an operation 514, method 500 includes determining whether or not the measurements of the candidate location of the detected vehicle based on the RF signals are within a predetermined area of the location of the detected vehicle based on the acoustic signals from the acoustic sensors. For example, as shown in FIG. 3, third vehicle 211 may provide RF signals associated with measurements of its location to RF positioning system 104. These measurements of the candidate location of third vehicle 211 may be compared with the location of third vehicle 211 determined based on fourth acoustic signal 310 and fifth acoustic signal 311 received by fourth acoustic sensor 212 and fifth acoustic sensor 213 to determine whether the measurements based on the RF signals are within a predetermined area of the acoustically determined location of third vehicle 211.

Upon determining at operation 514 that the measurements based on the RF signals from RF positioning system 104 are not within the predetermined area, method 500 may proceed to an operation 516 where the measurements are discarded or rejected. In other words, because the acoustically determined location did not confirm the measurements obtained by RF positioning system 104, method 500 may filter or screen out these measurements as being inaccurate or spurious. For example, the measurements may include false measurement 221 of a candidate location of third vehicle 211 shown in FIG. 2. In this example, because false measurement 221 of the candidate location of third vehicle 211 obtained from RF positioning system 104 is not within a predetermined area of the detected location of third vehicle 211 based on fourth acoustic signal 310 and fifth acoustic signal 311 received by fourth acoustic sensor 212 and fifth acoustic sensor 213, acoustic sensor system 106 may discard false measurement 221 so that it is not provided to vehicle location database 110. With this arrangement, the accuracy of location tracking system 100 may be improved.

Upon determining at operation 514 that the measurements based on the RF signals from RF positioning system 104 are within the predetermined area, method 500 may proceed to an operation 518. At operation 518, the measurements associated with the candidate location of the detected vehicle based on the RF signals from RF positioning system 104 may be provided to vehicle location database 110. In this manner, acoustic sensor system 106 may act as a pre-filter or screening stage for measurements from RF positioning system 104 to eliminate false measurements caused by reflected RF signals.

Figure 6:
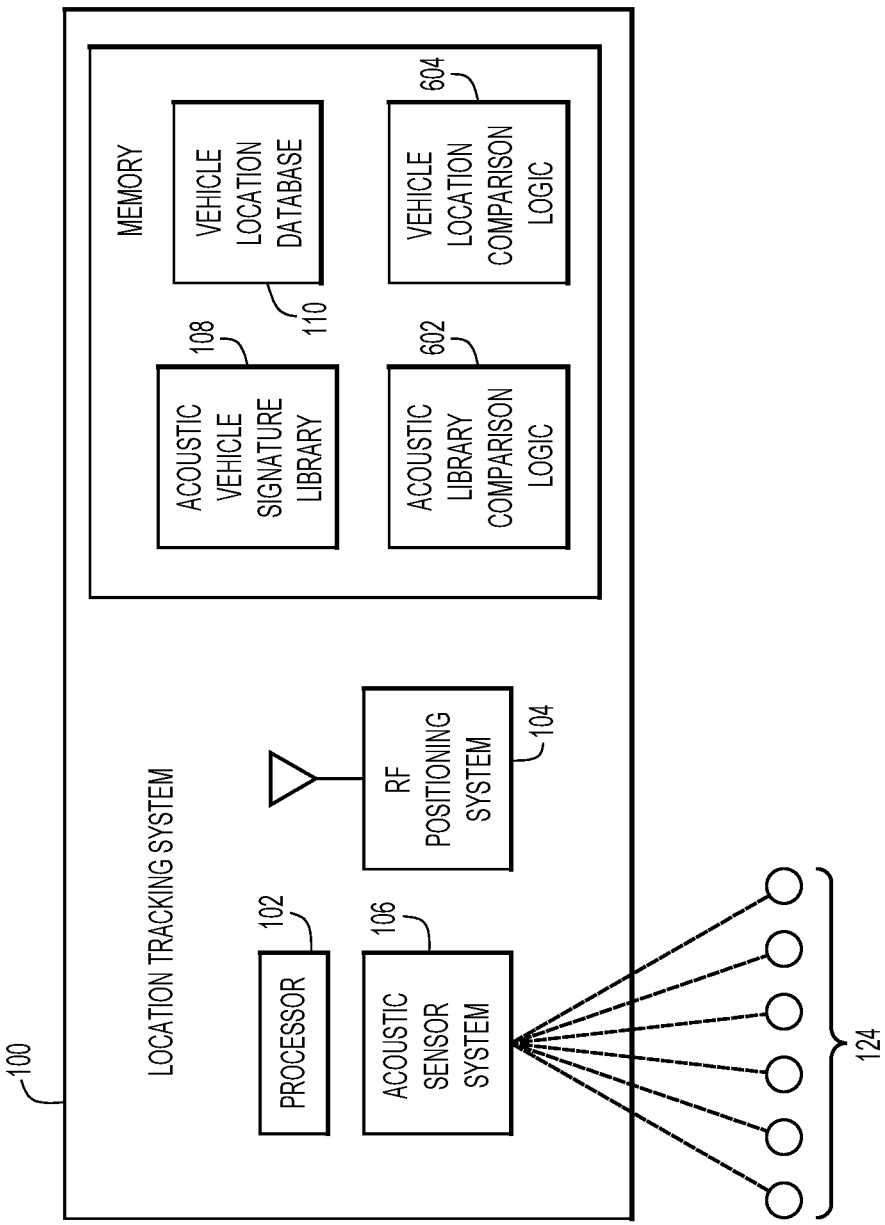
FIG. 6 is a block diagram of a location tracking system for implementing acoustic vehicle location tracking, according to an example embodiment.

Referring now to FIG. 6, a block diagram of location tracking system 100 for implementing acoustic vehicle location tracking according to an example embodiment is shown. In some embodiments, one or more operations of acoustic vehicle location tracking as described in reference to FIGS. 1-5 above may be implemented by location tracking system 100. In this embodiment, location tracking system 100 includes processor 102 in communication with at least RF positioning system 104 and acoustic sensor system 106, including plurality of acoustic sensors 124. Processor 102 of location tracking system 100 may also be in communication with a memory 600. Memory 600 may include acoustic vehicle signature library 108 and/or vehicle location database 110, as described above.

In some embodiments, memory 600 may be read only memory (ROM), random access memory (RAM), magnetic disk storage media devices, optical storage media devices, flash memory devices, electrical, optical, or other physical/tangible memory storage devices. Thus, in general, the memory 600 may comprise one or more tangible (non-transitory) computer readable storage media (e.g., a memory device) encoded with software comprising computer executable instructions and when the software is executed (by processor 102) it is operable to perform the operations described herein.

In particular, location tracking system 100 performs the operations described above in connection with FIGS. 1-5 when executing the software stored in memory 600. In an example embodiment, memory 600 may include an acoustic library comparison logic 602 and/or a vehicle location comparison logic 604. Acoustic library comparison logic 602 may include instructions for implementing operations associated with comparing received acoustic signals to acoustic information stored in acoustic vehicle signature library 108, as described above, e.g., in connection with operations of method 400 and/or operations of method 500. Vehicle location comparison logic 604 may include instructions for implementing operations associated with determining and/or comparing vehicle locations from acoustic sensor system 106 and/or RF positioning system 104, as described above, e.g., in connection with operations of method 400 and/or operations of method 500.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A system comprising:
   a radio-frequency positioning system;
   a plurality of acoustic sensors;
   a vehicle location database; and
   at least one processor in communication with the radio-frequency positioning system, the plurality of acoustic sensors, and the vehicle location database;
   wherein the at least one processor is configured to:
      receive, from the radio-frequency positioning system, signals associated with measurements of a candidate location for each vehicle of a plurality of vehicles;
      receive, from the plurality of acoustic sensors, one or more acoustic signals associated with a detected vehicle of the plurality of vehicles;
      compare the one or more acoustic signals to an acoustic vehicle signature library to determine whether the one or more acoustic signals match acoustic information associated with at least one vehicle of the plurality of vehicles, wherein the acoustic vehicle signature library includes a plurality of acoustic information associated with the plurality of vehicles;
      upon determining that the one or more acoustic signals match acoustic information associated with at least one vehicle in the acoustic vehicle signature library, compare the measurements of the candidate location of the detected vehicle based on the signals from the radio-frequency positioning system with a location of the detected vehicle based on the one or more acoustic signals from the plurality of acoustic sensors; and upon determining that one or more of the measurements of the candidate location is within a predetermined area of the location of the detected vehicle, provide the one or more measurements to the vehicle location database.

2. The system of claim 1, wherein the at least one processor is further configured to:

upon determining that one or more of the measurements of the candidate location are not within the predetermined area, discard the one or more measurements so that they are not provided to the vehicle location database.

3. The system of claim 1, wherein the plurality of vehicles are located in an underground mining facility including at least two levels; and wherein the predetermined area is associated with a particular level of the underground mining facility.

4. The system of claim 1, wherein the one or more measurements that are within the predetermined area are used by the vehicle location database to determine the candidate location of the detected vehicle.

5. The system of claim 1, wherein the candidate location is determined prior to comparing the measurements of the candidate location to the location of the detected vehicle based on the one or more acoustic signals.

6. The system of claim 1, wherein the acoustic vehicle signature library includes acoustic information associated with a plurality of vehicle groups; and wherein each vehicle group includes at least two vehicles of the plurality of vehicles sharing a common characteristic.

7. The system of claim 6, wherein comparing the one or more acoustic signals associated with the detected vehicle to the acoustic vehicle signature library further comprises determining whether the one or more acoustic signals match acoustic information associated with a particular vehicle group of the plurality of vehicle groups.

8. The system of claim 6, wherein the common characteristic is an assigned duty area.

9. The system of claim 8, wherein the predetermined area is a working area associated with the detected vehicle; and wherein determining that the one or more of the measurements of the candidate location are within the predetermined area further includes determining that the assigned duty area corresponds to the working area.

10. A method comprising:

receiving, from a radio-frequency positioning system, signals associated with measurements of a candidate location for each vehicle of a plurality of vehicles;

receiving, from a plurality of acoustic sensors, one or more acoustic signals associated with a detected vehicle of the plurality of vehicles;

comparing the one or more acoustic signals to an acoustic vehicle signature library to determine whether the one or more acoustic signals match acoustic information associated with at least one vehicle of the plurality of vehicles, wherein the acoustic vehicle signature library includes a plurality of acoustic information associated with the plurality of vehicles;

upon determining that the one or more acoustic signals match acoustic information associated with at least one vehicle in the acoustic vehicle signature library, comparing the measurements of the candidate location of the detected vehicle based on the signals from the radio-frequency positioning system with a location of the detected vehicle based on the one or more acoustic signals from the plurality of acoustic sensors; and upon determining that one or more of the measurements of the candidate location is within a predetermined area of the location of the detected vehicle, providing the one or more measurements to the vehicle location database.

11. The method of claim 10, further comprising:

upon determining that one or more of the measurements of the candidate location are not within the predetermined area, discarding the one or more measurements so that they are not provided to the vehicle location database.

12. The method of claim 10, wherein the plurality of vehicles are located in an underground mining facility that includes at least two levels; and wherein the predetermined area is associated with a particular level of the underground mining facility.

13. The method of claim 10, wherein the one or more measurements that are within the predetermined area are used by the vehicle location database to determine the candidate location of the detected vehicle.

14. The method of claim 10, wherein the acoustic vehicle signature library includes acoustic information associated with a plurality of vehicle groups; and wherein each vehicle group includes at least two vehicles of the plurality of vehicles sharing a common characteristic.

15. The method of claim 14, wherein comparing the one or more acoustic signals associated with the detected vehicle to the acoustic vehicle signature library further comprises determining whether the one or more acoustic signals match acoustic information associated with a particular vehicle group of the plurality of vehicle groups.

16. The method of claim 14, wherein the common characteristic is an assigned duty area.

17. The method of claim 16, wherein the predetermined area is a working area associated with the detected vehicle; and wherein determining that the one or more of the measurements of the candidate location are within the predetermined area further includes determining that the assigned duty area corresponds to the working area.

18. A non-transitory computer readable storage media encoded with instructions that, when executed by a processor, cause the processor to perform operations comprising:

receiving, from a radio-frequency positioning system, signals associated with measurements of a candidate location for each vehicle of a plurality of vehicles;

receiving, from a plurality of acoustic sensors, one or more acoustic signals associated with a detected vehicle of the plurality of vehicles;

comparing the one or more acoustic signals to an acoustic vehicle signature library to determine whether the one or more acoustic signals match acoustic information associated with at least one vehicle of the plurality of vehicles, wherein the acoustic vehicle signature library includes a plurality of acoustic information associated with the plurality of vehicles;

upon determining that the one or more acoustic signals match acoustic information associated with at least one vehicle in the acoustic vehicle signature library, comparing the measurements of the candidate location of the detected vehicle based on the signals from the radio-frequency positioning system with a location of the detected vehicle based on the one or more acoustic signals from the plurality of acoustic sensors; and upon determining that one or more of the measurements of the candidate location is within a predetermined area of the location of the detected vehicle, providing the one or more measurements to the vehicle location database.

19. The non-transitory computer readable storage media of claim 18, wherein the acoustic vehicle signature library includes acoustic information associated with a plurality of vehicle groups; and wherein each vehicle group includes at least two vehicles of the plurality of vehicles sharing a common characteristic.

20. The non-transitory computer readable storage media of claim 19, wherein the common characteristic is an assigned duty area;

wherein the predetermined area is a working area associated with the detected vehicle; and wherein determining that the one or more of the measurements of the candidate location are within the predetermined area further includes determining that the assigned duty area corresponds to the working area.

* * * * *